Oct. 18, 1955    R. A. WYMAN    2,721,068
QUARRYING IMPLEMENT FOR CUTTING SLOTS
Filed Oct. 31, 1952    2 Sheets-Sheet 1

Inventor:
Robert A. Wyman.
by Louis A. Maxam.
Attorney.

Inventor:
Robert A. Wyman
by Louis A. Maxam.
Attorney

United States Patent Office 2,721,068
Patented Oct. 18, 1955

2,721,068

QUARRYING IMPLEMENT FOR CUTTING SLOTS

Robert A. Wyman, Claremont, N. H., assignor to Joy Manufacturing Company, Pittsburgh, Pa., a corporation of Pennsylvania Application October 31, 1952, Serial No. 317,905

19 Claims. (Cl. 262—33)

My invention relates to percussive tools and more particularly to slotter drills for cutting slots in marble, limestone or other material.

A conventional method of forming narrow slots in marble, limestone and other materials is to cause an appropriate tool to be driven against the material, to retract it slightly and move it to a suitable position for action on an adjacent and perhaps partially overlapping area, and again to drive it against the material, and to repeat this operation, possibly hundreds of times, as the apparatus is moved from one end of a quarry bar to the other, and then to reverse the travel of the apparatus along the bar, there being a formation of a slot and a progressive deepening of the latter until a groove or channel of the desired depth is completed. Desirably a slotting tool utilized in this manner will have a plurality of edges and the number, arrangement and structure (shape) of these edges will greatly affect the speed of slot formation. The several edges may be formed on a single steel by the use of suitable forging equipment, or be formed one or more on steels which are clamped side to side to form a slotting tool.

A slotter steel according to my invention may have an elongated generally rectangular cross section or outline at its forward end and may be formed by clamping together a plurality of rectangular steels, each having a single edge upon it, or it may be formed as a unitary steel provided adequate sharpening equipment is available. The steel may desirably have at each side of the mid-point longitudinally thereof a pair of edges each extending lengthwise of the generally rectangular outline of the forward end of the steel and desirably positioned along the long sides of the rectangle. Desirably the most remote edges will be at opposite sides of the outline, and the mutually more adjacent edges will be at the other sides of the outline from each other and from the edges next to them which lie near the ends of the outline. Desirably, there may be arranged between the pairs of edges which lie at opposite sides of the midpoint longitudinally of the bit an intermediate edge, and said intermediate edge may extend either transversely between the long sides of the rectangular outline of the bit or may extend longitudinally of the outline and be arranged midway between and parallel to the long sides of such rectangular outline. When the intermediate edge extends transversely, the nearer longitudinally extending edges will be near the opposite ends of the intermediate edge, and probably separated from the intermediate transverse edge somewhat, especially when the various edges are provided on separate steels. In any event, when an intermediate edge is used in a five-edge bit as herein illustrated it will have two edges between it and each end of the bit face.

It is an object of this invention to provide an improved percussive tool. It is another object of the invention to provide an improved slotter steel. It is a further object of the invention to provide an improved slotter steel adapted for percussive action upon the material to be slotted and having a working end adapted to form at a rapid rate a clean-walled slot. Other objects and advantages of the invention will appear in the course of the following description of certain illustrative embodiments and of the appended claims.

In the accompanying drawings, in which three illustrative embodiments of the invention are shown:

Figure 1:
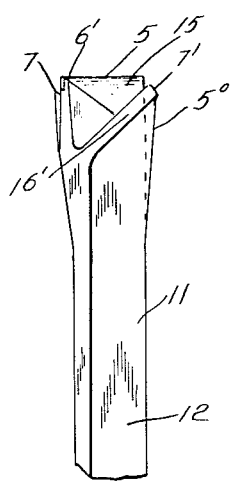
Fig. 1 is an edge view, slighlty in perspective, of a slotter steel according to one embodiment of the invention.

Referring now to the drawings, and first to Figs. 1 to 4 thereof, there may be observed a slotter steel 11. The working end of the steel 11 is somewhat thicker, between its wider surfaces, than the thickness of the shank portion 12 of the steel, in order that clearance may be cut. The steel may most readily be forged and sharpened if each of its edges, later described, is formed on a separate steel, e. g. a 1¼" x 1¼" or somewhat smaller rectangular bar of suitable steel, but the separation of the steel into a plurality of parts each carrying but one edge is obviously not essential as multiple part and unitary constructions are generally recognized equivalents when the differences are no greater than those which would exist here.

The construction of Figs. 1 to 4 provides a working end whose outline is generally rectangular, and materially longer in the direction of the slotting operation than its dimension transverse to the direction of the slotting operation. There is illustrated a centrally disposed, transverse edge 5 with other pairs of other edges 6, 7 and 6', 7', at each side of said central transverse edge 5. The individual edges 6, 7 and 6', 7' extend lengthwise of the rectangle of the front end of the steel, and are at opposite sides of the bit end, and the edges 6, 6' nearer the central edge 5 are disposed at the opposite ends of the latter and extend at right angles to it. The central edge 5 is formed at the front end of a wedge-shaped tapered portion 15 whose apex line (said edge) is midway between the sides of the base of the wedge, and each of the other edges is at the apex of a chisel-shaped portion 16 or 16', so shaped as to bring the edge at a side of the bit. If the tool is of unitary construction, the depth of the groove between the central edge and the adjacent side edges may be made relatively shallow as at 17, and an equivalent effect is obviously possible with proper forging of a plural part tool.

Figure 2:
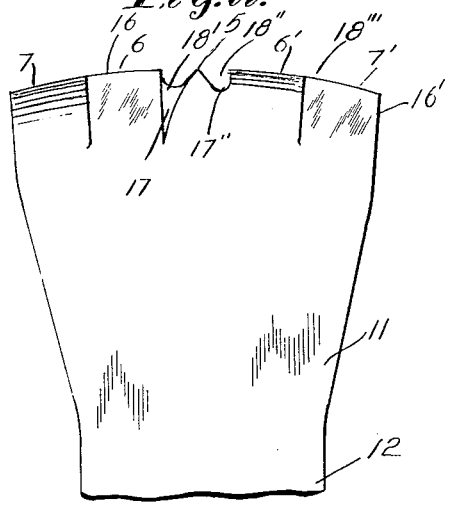
Fig. 2 is a side view, looking at a longer side, of such a steel.
Figure 3:
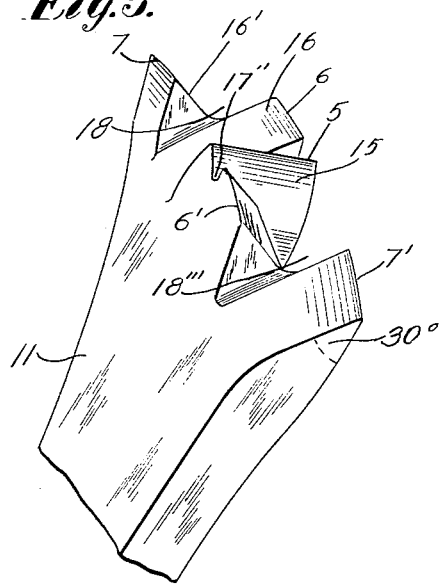
Fig. 3 is a perspective view of the working end of the steel of Fig. 1.
Figure 4:
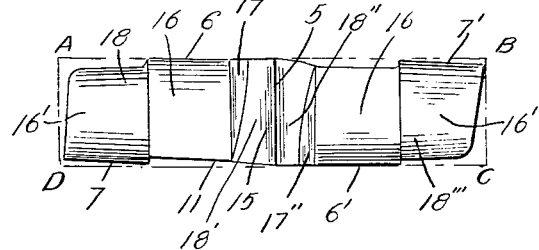
Fig. 4 is a face view of the working end of that steel.

Now viewing this steel from its forward end or working face (see Fig. 4), it will be noted that the outline conforms generally to a rectangle ABCD of which the sides AB and CD are much longer than the ends BC and DA. Starting at the upper end of Fig. 3 and the left end of Fig. 4, it will be apparent that the edge 7 is at the forward end of a chisel-shaped portion 16', and the edge 6 at the forward end of a chisel-shaped portion 16 which is, as it were, the reverse of the portion 16', and the edges 6 and 7 are at opposite sides of the rectangle ABCD above mentioned. It will be noted that the forward faces of the chisel-shaped portions 16 and 16' are shown as formed by surfaces at the forward ends of which there are the edges 6 and 7 and which lie in planes which intersect each other forwardly of the rearward ends of such sloping surfaces. As may be readily noted by inspecting Fig. 1, the surfaces mentioned extend to a point well to the rear of the line of intersection of the planes in which the surfaces lie. The transverse edge 5 is at the forward edge of a wedge-shaped portion 15 and lies in a plane as to which the opposite sides of said portion 15 are symmetrically disposed and which plane constitutes, as shown, the central transverse plane of the steel; and the edge 6 is at one end of the transverse edge 5 while the edge 6' is at the other end and the opposite side of the transverse edge 5. The edge 7' is at the opposite side of the front end of the steel, both as regards the edge 6' and the edge 7. A clearance is provided at 18 between the edges 6 and 7, another, at 18', between the edges 6 and 5, this being reduced at 17, a further clearance 18", reduced at 17", between the edges 5 and 6', and still a further clearance, 18''', between the edges 6' and 7'. The edges 6, 6', 7 and 7' are shown as individually slightly arcuate and as arcuately arranged, so that the bit may be, as shown in Figs. 1 and 2, slightly arcuate at its forwardmost portions. The indicated angles of the chisel-shaped portions are shown as 30° and the taper rearwardly of the forward end of the bit 5°, but, while these are desirable, they are not to be understood as limiting, but merely as illustrative.

Figure 5:
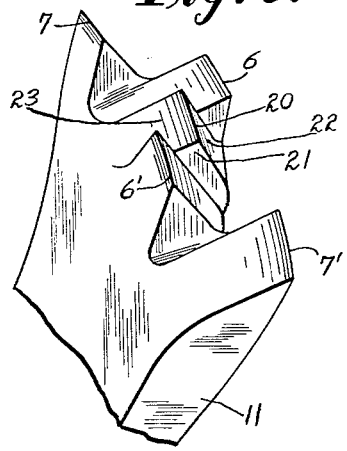
Figs. 5 and 6 are respectively perspective and end views of another bit embodying the invention.
Figure 6:
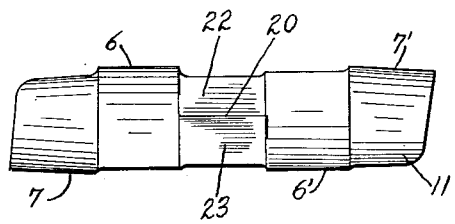

The modified slotter steel shown in Figs. 5 and 6 differs from that of the embodiment of Figs. 1 to 4 only in differences which grow out of the fact that instead of employing a transverse central edge 5, there is employed a central edge 20 which extends parallel to the longitudinal sides of the rectangular outline of the end of the bit. The edge 20 lies midway between the elongated sides of the front end of the bit, and the edges 6 and 6' lie adjacent to it. The edge 20 is supported by a wedge-shaped forward end 21 having forward surfaces 22 and 23 which form a dihedral angle whose edge coincides, at least essentially, with the edge 20 of the bit, doing so fully if the edge 20 is straight, and if there be a slight curvature of the edge 20 as might be desirable if the forward end of the bit is to be made arcuate in accordance with the arrangement indicated in Fig. 2, there will be "essential" coincidence.

The modified form of the bit of Figs. 5 and 6, then, includes a central edge 20 midway between the sides of the rectangular outline of the bit, a pair of edges 6 and 6' at mutually opposite sides of the bit end, and another pair of edges 7 and 7' at mutually opposite sides of the central plane of the bit in which the edge 20 lies and at mutually opposite sides of the bit from the edges 6 and 6' which are respectively nearest to them.

Figure 7:
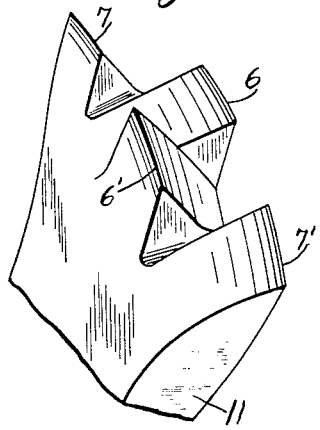
Figs. 7 and 8 are respectively perspective and end views of a further bit embodying the invention.
Figure 8:
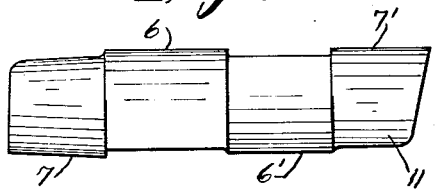

Under certain circumstances it is practicable to omit a central edge entirely and to employ neither a transverse nor a longitudinally extending central edge. Such an arrangement is shown in Figs. 7 and 8. In that construction there is an end edge at one side of the bit, an adjacent edge at the opposite side of the bit, a third edge at the first side of the bit, and a fourth edge at the side of the bit opposite the first and third edges. The edges mentioned correspond in structure and in support to the corresponding edges in the first two embodiments.

It will be understood that the particular edge disposition will be selected in any given case in the light of the material to be slotted.

It will be evident that slotter steels constructed in accordance with this invention will have adequate clearance to prevent binding, which clearance will cut for themselves, that they will cut rapidly, and will cut clean side walls and chop the material at the bottom of the groove most effectively to effect its detachment without unnecessarily comminuting it. They are rugged, easily sharpenable, and durable in use. When made in a plurality of parts they may have their parts rigidly secured together in any suitable manner.

While there is in this application specifically described three forms which the invention may assume in practice, it will be understood that these forms are shown for purposes of illustration and that the invention may be modified and embodied in various other forms without departing from its spirit or the scope of the appended claims.

What I claim is:

1. A slotting steel or tool having a working face which is elongated in the direction of the slot to be formed, and having a pair of edges at one side of its central transverse line and another pair of edges at the other side of its central transverse line, each such pair of edges including an edge extending along one side of said elongated face and an edge extending along the other side of said elongated face, said edges of each pair being spaced transversely of said steel or tool by the full width of the latter and being arranged at the forward ends of sloping surfaces which lie in planes intersecting each other forwardly of the rearward ends of said sloping surfaces.

2. A slotting steel or tool having a working face which is elongated in the direction of the slot to be formed, and having a pair of edges at one side of its central transverse line and another pair of edges at the other side of its central transverse line, each such pair of edges including an edge extending along one side of said elongated face and an edge extending along the other side of said elongated face, the edges which are correspondingly spaced with respect to said central transverse line extending along the opposite sides of said elongated face and being spaced transversely of said elongated face by the full width of the latter and being arranged at the forward ends of sloping surfaces which lie in planes intersecting each other forwardly of the rearward ends of said sloping surfaces.

3. A slotting steel or tool having a working face which is elongated in the direction of the slot to be formed, and having a pair of edges at one side of its central transverse line and another pair of edges at the other side of its central transverse line, each such pair of edges including an edge extending along one side of said elongated face and an edge extending along the other side of said elongated face, and said steel having an edge intermediate said pairs of edges.

4. A slotting steel or tool having a working face which is elongated in the direction of the slot to be formed, and having a pair of edges at one side of its central transverse line and another pair of edges at the other side of its central transverse line, each such pair of edges including an edge extending along one side of said elongated face and an edge extending along the other side of said elongated face, and said steel having an edge intermediate said pairs of edges and extending longitudinally of said face midway between the sides of the latter.

5. A slotting steel or tool having a working face which is elongated in the direction of the slot to be formed, and having a pair of edges at one side of its central transverse line and another pair of edges at the other side of its central transverse line, each such pair of edges including an edge extending along one side of said elongated face and an edge extending along the other side of said elongated face, and said steel having an edge intermediate said pairs of edges and extending transversely of said elongated face.

6. A slotting steel or tool having a working face which is elongated in the direction of the slot to be formed, and having a pair of edges at one side of its central transverse line and another pair of edges at the other side of its central transverse line, each such pair of edges including an edge extending along one side of said elongated face and an edge extending along the other side of said elongated face, said pairs of edges being the only edges at said working face and the edges at one side of said face being spaced from those at the other side of said face by the full transverse width of said working face.

7. A slotting tool having a working face elongated in the direction of the slot to be formed and relatively narrower transversely and having five working edges, to wit: a longitudinal edge which is located midway between the opposite sides of said working face and equidistantly from its ends, and, between said longitudinal edge and each end of said working face, two further longitudinal edges, the two longitudinal edges between said first edge and each end of said face being disposed at the opposite sides of said face.

8. A slotting tool having a working face elongated in the direction of the slot to be formed and relatively narrower transversely and having five working edges, to wit: a longitudinal edge which is located midway between the opposite sides of said working face and equidistantly from its ends, and, between said longitudinal edge and each end of said working face, two further longitudinal edges differently spaced from said first edge, the two longitudinal edges between said first edge and each end of said face being disposed at the opposite sides of said face, and the ones of said further longitudinal edges which are nearer said first mentioned edge being at opposite sides of said face.

9. A slotting tool having a working face elongated in the direction of the slot to be formed and relatively narrower transversely and having five working edges, to wit: a transverse edge which is located midway between the opposite ends of said working face, and, at each side of said transverse edge, two longitudinal edges, said two longitudinal edges at each side of said transverse edge being disposed at the opposite sides of said working face.

10. A slotting tool having a working face elongated in the direction of the slot to be formed and relatively narrower transversely and having five working edges, to wit: a transverse edge which is located midway between the opposite ends of said working face and, at each side of said transverse edge, two longitudinal edges, said two longitudinal edges at each side of said transverse edge being disposed at the opposite sides of said working face, and said longitudinal edges which are nearer said transverse edge being adjacent the opposite ends of said transverse edge.

11. A slotting tool having a working face elongated in the direction of the slot to be formed and relatively narrower transversely and having five working edges, to wit: a transverse edge which is located midway between the opposite ends of said working face and, at each side of said transverse edge, two longitudinal edges, said two longitudinal edges at each side of said transverse edge being disposed at the opposite sides of said working face and at the forward ends of oblique surfaces which extend for the full width of the bit at its forward end.

12. A slotting tool having a working face elongated in the direction of the slot to be formed and relatively narrower transversely and having five working edges, to wit: a transverse edge which is located midway between the opposite ends of said working face and, at each side of said transverse edge, two longitudinal edges, said two longitudinal edges at each side of said transverse edge being disposed at the opposite sides of said working face, and said longitudinal edges which are nearer said transverse edge being adjacent the opposite ends of said transverse edge, and at the forward ends of oblique surfaces which extend for the full width of the bit at its forward end.

13. A slotting tool having a working face elongated in the direction of the slot to be formed and relatively narrower transversely and having five working edges, to wit: a transverse edge which is located midway between the opposite ends of said working face, and at the apex of an isosceles triangle and, at each side of said transverse edge, two longitudinal edges, said two longitudinal edges at each side of said transverse edge being disposed at the opposite sides of said working face.

14. A slotting tool having a working face elongated in the direction of the slot to be formed and relatively narrower transversely and having five working edges, to wit: a transverse edge which is located midway between the opposite ends of said working face, and at the apex of a symmetrically formed wedge-like portion and, at each side of said transverse edge, two longitudinal edges, said two longitudinal edges at each side of said transverse edge being disposed at the opposite sides of said working face, and said longitudinal edges which are nearer said transverse edge being adjacent the opposite ends of said transverse edge.

15. A slotting tool having a working face elongated in the direction of the slot to be formed and relatively narrower transversely and having five working edges, to wit: a transverse edge which is located midway between the opposite ends of said working face, and at the apex of a symmetrically formed wedge-like portion and, at each side of said transverse edge, two longitudinal edges, said two longitudinal edges at each side of said transverse edge being disposed at the opposite sides of said working face and at the forward ends of oblique surfaces which extend for the full width of the bit at its forward end.

16. A slotting tool having a working face elongated in the direction of the slot to be formed and relatively narrower transversely and having five working edges, to wit: a transverse edge which is located midway between the opposite ends of said working face, and at the apex of a symmetrically formed wedge-like portion and, at each side of said transverse edge, two longitudinal edges, said two longitudinal edges at each side of said transverse edge being disposed at the opposite sides of said working face, and said longitudinal edges which are nearer said transverse edge being adjacent the opposite ends of said transverse edge, and at the forward ends of oblique surfaces which extend for the full width of the bit at its forward end.

17. A slotting tool having a working face elongated in the direction of the slot to be formed and relatively narrower transversely, and having a central transverse edge and at each side of the latter a pair of parallel edges of which one lies at each side edge of the working face.

18. A slotting tool having a working face elongated in the direction of the slot to be formed and relatively narrower transversely, and having edges at each of its longer sides at each side of its centre, and having at least one transversely extending edge.

19. A slotting tool having a working face elongated in the direction of the slot to be formed and relatively narrower transversely and having five working edges, to wit: a longitudinal edge which is located midway between the opposite sides of said working face and equidistantly from its ends, and, at each side of said longitudinal edge, two further longitudinal edges, the two further longitudinal edges at either end of said first edge being disposed at the opposite sides of said working face and at the forward ends of oblique surfaces which extend for the full width of the bit at its forward end.

References Cited in the file of this patent
UNITED STATES PATENTS

| | | |
|---|---|---|
| 340,792 | Legg | Apr. 27, 1886 |
| 700,466 | Wylie | May 20, 1902 |
| 884,150 | Hardsocg | Apr. 7, 1908 |
| 1,884,182 | Pearce et al. | Oct. 25, 1932 |
| 1,995,060 | Gray et al. | Mar. 17, 1935 |
| 2,155,713 | Jargick | Apr. 25, 1939 |